United States Patent [19]

Lopez

[11] Patent Number: 6,161,669
[45] Date of Patent: Dec. 19, 2000

[54] CLUTCH MECHANISM FOR CLUTCH FRICTION WITH LOW DECLUTCHING EFFORT

[75] Inventor: Carlos Lopez, Madrid, Spain

[73] Assignee: Valeo, France

[21] Appl. No.: 09/230,547

[22] PCT Filed: May 28, 1998

[86] PCT No.: PCT/FR98/01067

§ 371 Date: Apr. 19, 1999

§ 102(e) Date: Apr. 19, 1999

[87] PCT Pub. No.: WO98/54478

PCT Pub. Date: Dec. 3, 1998

[30] Foreign Application Priority Data

May 30, 1997 [FR] France .................................. 97 06656

[51] Int. Cl.$^7$ .................................................. F16D 13/71
[52] U.S. Cl. ................................... 192/70.25; 192/70.27; 192/89.22; 192/111 A
[58] Field of Search ............................. 192/89.22, 89.23, 192/70.25, 111 A, 70.27

[56] References Cited

U.S. PATENT DOCUMENTS

| | | |
|---|---|---|
| 4,602,708 | 7/1986 | Nagano ................................. 192/70.27 |
| 4,655,334 | 4/1987 | Valier . |
| 5,088,583 | 2/1992 | Takeuchi et al. ..................... 192/70.27 |
| 5,088,584 | 2/1992 | Inaba et al. ....................... 192/70.27 X |
| 5,450,934 | 9/1995 | Maucher . |
| 5,540,313 | 7/1996 | Weidinger . |
| 5,632,365 | 5/1997 | Maucher ............................. 192/70.25 |
| 5,715,920 | 2/1998 | Lindner et al. . |
| 5,823,312 | 10/1998 | Reik et al. .......................... 192/70.25 |
| 5,855,267 | 1/1999 | Giroire et al. . |
| 5,862,901 | 1/1999 | Weiss et al. ......................... 192/70.25 |
| 5,868,232 | 2/1999 | Fukushima ....................... 192/89.23 X |

FOREIGN PATENT DOCUMENTS

| | | |
|---|---|---|
| 1 392 569 | 12/1965 | France . |
| 2688588 | 9/1993 | France . |
| 2753503 | 3/1998 | France . |
| 2753758 | 3/1998 | France . |
| 4201132 | 7/1992 | Germany . |
| 2286640 | 8/1995 | United Kingdom . |
| 2294301 | 4/1996 | United Kingdom . |
| 2310898 | 9/1997 | United Kingdom . |

*Primary Examiner*—Rodney H. Bonck
*Assistant Examiner*—Saúl Rodríguez
*Attorney, Agent, or Firm*—Liniak, Berenato, Longacre & White

[57] ABSTRACT

The invention concerns a clutch mechanism for clutch friction, in particular for motor vehicles, comprising a cover (8) with a base (80), a pressure plate (3) with a front friction face (30) to co-operate with a clutch friction, means (9) for linking in rotation, with axial mobility, the pressure plate (3) with the cover (8), and, inserted between the pressure plate (3) and the cover (8) base (80), a diaphragm (2) with an external peripheral portion (21) axially stressing the pressure plate (3) in the opposite direction from the cover (8) base (80) and extended inwards by fingers (23) to counter at will the action of said peripheral portion (21), a boost elastic (assistance) washer (7) acting on the diaphragm (2) fingers (23) in the disengaging direction resting on the cover (8), the mechanism being equipped with a device (90) taking up the wear of at least the friction clutch linings; the boost (assistance) washer (7) being axially arranged between the pressure plate (3) and the diaphragm (2).

12 Claims, 2 Drawing Sheets

CLUTCH MECHANISM FOR CLUTCH FRICTION WITH LOW DECLUTCHING EFFORT

BACKGROUND OF THE INVENTION

1. Field of the Invention

The present invention concerns friction clutches with a low clutch release force, in particular for motor vehicles, and more particularly the clutch mechanism of a clutch of this kind.

2. Description of the Related Art

In a conventional clutch disposed between a driving shaft and a driven shaft a diaphragm bears against the back of a cover fixed to a rotational drive flywheel to move a pressure plate towards said flywheel, forming a reaction plate, to clamp the friction linings of a clutch friction disc between said pressure and reaction plates.

The drive flywheel is constrained to rotate with a first shaft, for example a driving shaft, and the clutch friction disc has at its inside periphery a hub by which it is constrained to rotate with a second shaft, for example a driven shaft.

The clutch is normally engaged to transmit torque between the driving and driven shafts.

To release the clutch in the case of a push type clutch a clutch release thrust bearing presses axially on the inside ends of fingers of the diaphragm to cause said diaphragm to pivot and to eliminate the force that the diaphragm applies to the axially mobile pressure plate in order to release the friction linings. Torque is then no longer transmitted from the driving shaft to the driven shaft because the friction linings are no longer clamped between the pressure and reaction plates constrained to rotate with the hollow cover.

The cover, the pressure plate and the diaphragm usually form a unitary assembly known as the clutch mechanism that is attached by its cover to the flywheel, elastic tongues which allow axial mobility coupling the pressure plate rotationally to the cover. The diaphragm has a hole in the centre and an outside peripheral part in the form of a Belleville washer extended inwardly by a central part divided into radial fingers by slots. The Belleville washer part of the diaphragm bears on the cover and on the pressure plate. Accordingly, the clutch release device of the clutch, which selectively opposes the action of the clutch engaging spring means, consists of the fingers of the diaphragm on whose inside end the clutch release thrust bearing operates, whereas the Belleville washer of the diaphragm constitutes axially acting clutch engaging spring means for clamping the friction linings between the pressure and reaction plates and therefore urging the pressure plate axially away from the back of the cover.

When unstressed, the diaphragm is frustoconical in shape. When fitted into the clutch its Belleville washer is pre-stressed and is flattened to a greater or lesser degree. The cone angle of the Belleville washer is modified on disengaging the clutch.

The characteristic curve of the diaphragm, which represents the force exerted as a function of the clutch release travel, for example at the inside end of the diaphragm fingers, is determined by the dimensions of its Belleville washer, in particular by the ratio of the height of the frustoconical Belleville washer when unstressed to the thickness of the diaphragm. The characteristic curve has a maximum.

Accordingly, the force to be applied to the inside end of the diaphragm fingers during release of the clutch increases to a maximum, decreases gradually to a minimum and then increases again.

There can be a considerable difference between the maximum force and the minimum force. For more information on the characteristic curve reference may be had to document FR-A-1 392 569, for example.

Document FR-A-1 392 569 describes a progressive action spring device external to the clutch friction disc to eliminate the aforementioned maximum during the clutch release travel. The device is mounted in series with the Belleville washer of the diaphragm and produces a spring force significantly less than that of the Belleville washer. The device has a limited travel between a pre-stressed position in which its force is maximum and a stressed position in which its force is minimum.

This achieves an increasing clutch release force at the clutch release thrust bearing.

Assistance of the required magnitude may not be obtained over the clutch release travel, the progressively acting device reducing the force applied by the diaphragm to the pressure plate during clutch release.

The load curves of the progressively acting device, which is usually mounted within the clutch, and the diaphragm have shapes that prevent them being combined to obtain a high level of clutch release assistance, in particular if the clutch release travel and force are to be compatible with existing clutch release devices. What is more, the shape of the curve of the progressive action device changes very quickly through the service life of the clutch, which eliminates clutch release assistance in direct proportion to the required level of assistance. To prevent ageing of the assistance device curve it is preferable to locate the device where its stiffness curve will remain stable in time and in particular at a location outside the progressive action area where lining contact and indentation change and cause the progressive action curve to change.

Consideration could be given to using an assistance spring in parallel with the diaphragm. In this case the assistance spring, for example in the form of a Belleville washer, could bear on the cover and on the inside end of the diaphragm fingers. In the clutch engaged position it could then apply a minimum force and thereafter, its cone angle varying, a force to assist release of the clutch. The assistance force must therefore be minimum in the clutch engaged position throughout the service life of the clutch.

The ideal for this type of implementation is to use an adjuster device, referred to hereinafter as the wear compensator device, which holds the diaphragm in substantially the same position all the time, regardless of wear of the friction linings of the disc and/or of the friction faces of the pressure and reaction plates, so that under all circumstances and throughout the service life of the clutch the assistance spring applies a very low force when the clutch is in the engaged position.

SUMMARY OF THE INVENTION

The aim of the present invention is to create, in a simple and economic manner, a friction clutch with a low clutch release force that also uses springs operating in parallel without significantly reducing the clamping forces on the friction linings when the clutch is engaged during the service life of the clutch, by virtue of the presence of a wear compensator device.

Clutch mechanisms of the above kind have already been proposed; one such mechanism is described for example in document FR-A-2 728 638. Unfortunately that mechanism has the drawback of requiring a special cover; it is also bulky in the axial direction.

The aim of the present invention is to propose a mechanism of the above kind that does not have such drawbacks.

Accordingly, in accordance with the invention, a clutch mechanism for friction clutches, in particular for motor vehicles, including a cover with a transversely oriented back and fixing means for fixing the clutch mechanism to a rotational drive flywheel, a pressure plate having a front friction face to co-operate with a clutch friction disc, means for rotationally coupling the pressure plate to the cover, allowing axial movement, and, disposed between the pressure plate and the back of the cover, a diaphragm having an outside peripheral part urging the pressure plate axially away from the back of the cover and extended inwardly by fingers to oppose selectively the action of said peripheral part, an assistance spring washer bearing on the cover and operating on the fingers of the diaphragm in the clutch release direction, the mechanism being equipped with a wear compensator device for compensating wear of at least the friction linings of the clutch friction disc, is characterised in that the assistance washer is disposed axially between the pressure plate and the diaphragm.

The spring characteristics of the assistance washer are advantageously chosen so that when the clutch is engaged and the clutch friction disc is new the action exerted by the assistance washer is very low or even zero.

The spring characteristics of the assistance washer are preferably chosen so that the action exerted by the assistance washer during clutch release increases and then decreases to a very low or even zero value when the clutch is released.

The fingers of the diaphragm are advantageously separated by radial slots that open into holes at the inside periphery of the peripheral part of the diaphragm and the assistance washer is globally radially inside the area delimited by the holes in the diaphragm.

The assistance washer preferably bears on the cover through the intermediary of a ring washer attached to the back of the cover by rivets that pass through holes in the diaphragm.

When the clutch is of the push type the assistance washer advantageously bears on an edge on the inside periphery of the ring washer and facing the pressure plate and is fixed to the fingers of the diaphragm, for example by rivets.

When the clutch is of the pull type the assistance washer advantageously bears on an edge at the inside periphery of the ring washer and facing the back of the cover.

The assistance washer preferably bears on the cover through heads of rivets that pass through holes in the diaphragm.

When the clutch is of the push type the assistance washer advantageously bears on an edge that faces the pressure plate and and is provided on the heads of the rivets.

When the clutch is of the pull type the assistance washer preferably bears on an edge that faces the back of the cover and is provided on the heads of the rivets.

When the clutch is of the pull type the outside periphery of the assistance washer is preferably attached to the rivets.

The inside periphery of the assistance washer is advantageously cut out to constitute teeth co-operating with the fingers of the diaphragm.

BRIEF DESCRIPTION OF THE DRAWINGS

The following description illustrates the invention with reference to the accompanying drawings, in which.

DETAILED DESCRIPTION OF THE PREFERRED EMBODIMENTS

Figure 1:
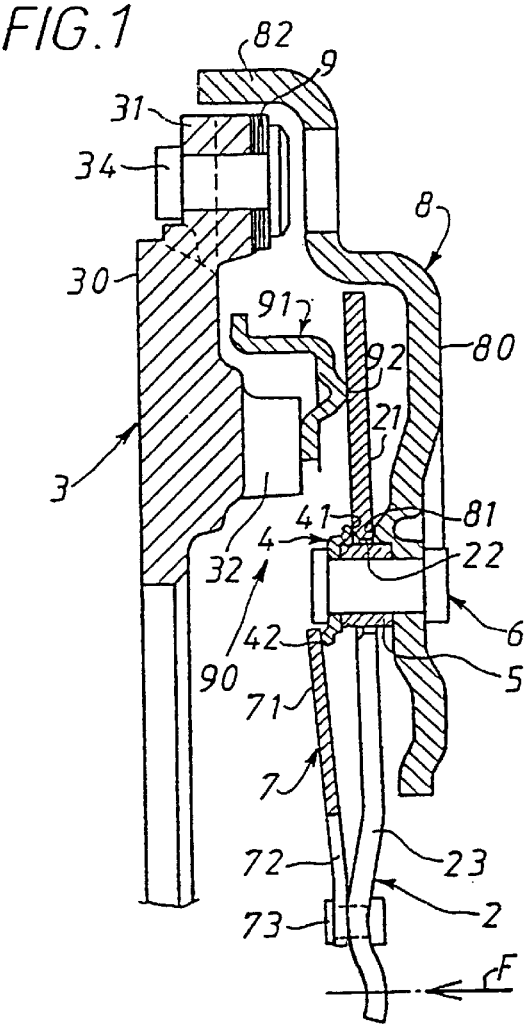
FIG. 1 is a half-view in axial section of a push type clutch mechanism in accordance with the invention in the engaged position.

A clutch whose clutch mechanism is shown in FIG. 1 includes an assembly of annular components, namely in axial succession a rotational drive flywheel for fixing the clutch to a first shaft, for example a driving shaft, a clutch friction disc having at its outside periphery friction linings and at its inside periphery a hub for rotationally coupling the clutch to a second shaft, for example a driven shaft, a pressure plate 3, a cover 8 which here is hollow with a globally transverse back 80 having a hole at the centre and, at its outside periphery, fixing means for fixing the cover 8 to the flywheel forming the pressure plate.

The flywheel has a friction face 10 on the back and central holes for fixing it to the driving shaft by means of screws. The flywheel is cast in one piece with the pressure plate 3 which has a friction face 30 on the front facing the friction face of the flywheel 1. The flywheel and the pressure plate 3 are made of cast iron.

The clutch friction disc also includes a support disc carrying the friction linings, which may be subdivided. The linings are on respective opposite sides of the support disc to which they are riveted, glued or brazed, for example.

Progressive axially acting spring means are disposed between the two linings in a manner known in itself for progressive clamping thereof between the flywheel and the pressure plate 3. These means can be of any appropriate kind. They are obtained by conforming the support disc, for example. By way of non-limiting example the disc can have a central part for coupling it, elastically or otherwise, to the hub and a peripheral part subdivided into radial blades, for example of the tripod type. Each blade then has a central bearing area for fixing one of the friction linings and two outside peripheral bearing areas adapted to co-operate with the other friction lining.

As mentioned hereinabove, the disc can be elastically coupled to the hub. Alternatively, the disc is rigidly coupled to the hub, in which case the flywheel is subdivided into two masses elastically coupled together by circumferential or radial action springs. For more details of this see document GB-A-2 294 301 which shows a divided flywheel of the above kind and the friction linings.

As an alternative to this, the flywheel can be in two parts and include a support flange fixed at its inside periphery to the driving shaft and at its outside periphery to a reaction plate providing the friction face. In this case the cover 8 can be assembled to the two-part flywheel by axially oriented lugs on its cylindrical peripheral skirt 82. These tenon-shape lugs are then engaged in mortices formed on the outside periphery of the reaction plate or the support flange. The free section of the lugs, forming the aforementioned fixing means of the cover 8, can be crimped or welded to the flange or to the reaction plate, as described for example in French Patent Application 95 12523 filed Oct. 24, 1995.

Here the cover 8 is of conventional shape, as described for example in document FR-A-2 572 480. To be more precise, the skirt 82 is divided into spacers facing bearing areas with holes for screws for fixing the cover 8 to the reaction plate.

In a motor vehicle application, the driving shaft is the engine output shaft of the vehicle to the crankshaft of which the flywheel 1 is fixed and the driven shaft is the input shaft of the gearbox. It is of course possible to interchange the above structures, the first shaft being a driven shaft and the second shaft a driving shaft.

In this figure the pressure plate 3 is coupled rotationally to the cover 8 by elastic tongues enabling the pressure plate 3 to move axially relative to the cover 8. The pressure plate 3 is therefore constrained to rotate with the cover 8 and the flywheel but mobile axially relative to them.

Here the tongues 9 are tangentially oriented and urge the pressure plate 3 towards the back 80 of the cover. The elastic tongues 9 are therefore axially acting tongues and have a return action. As an alternative to this the tongues can be radially oriented.

The tangential tongues 9 are fixed at one end to the lugs 31 projecting radially from the pressure plate 3 and at their other end to a radial area on the cover. The tongues 9 are equi-angularly spaced in the circumferential direction, in a manner that is known in itself; the number of tongues and the number of lugs 31 depend on the application but in private motor cars there are generally three tongues 9 or three groups of tongues.

The tongues 9 are fixed to the cover lands and to the lugs 31 by fixing members 34, usually rivets, alternatively screws or bolts.

The pressure plate 3 can be moved axially by axially acting clutch engaging means controlled by clutch release means, here a diaphragm 2 articulated to the cover 8; in a manner that is known itself the diaphragm 2 has a peripheral part 21 in the form of a Belleville washer extended internally by fingers 23 separated by radial slots that open into holes 22 at the inside periphery of the peripheral part 21 of the diaphragm 2.

Here the clutch is of the push type, which means that a clutch release thrust bearing, not shown, must push on the inside end of the fingers 23 in the direction of the arrow F to disengage the clutch. To this end the back 80 of the cover 8 has a primary support 81 consisting here of a pressed portion of the back 80 of the cover 8 and a secondary support 41 consisting of a rounded edge at the outside periphery of a ring washer 4 attached to the cover 8 by rivets 6, the primary and secondary supports 81 and 41 being radially in line with each other; spacer bushes 5 are disposed axially between the ring washer 4 and the back 80 of the cover 8 and the bodies of the rivets 6 pass through them; the bushes 5 and therefore the rivets 6 pass through some of the holes 22 in the diaphragm 2. The bush 5 is of course made from a hard material enabling the rivets 6 to be peened without deforming.

To assure a constant clamping force the clutch mechanism is equipped with a wear compensator device 90; the device 90 is described in detail in French Patent Application FR-A-2 753 503 filed Sep. 17, 1996 to which reference should be had for further information, which corresponds to U.S. patent application Ser. No. 09/068,463 the corresponding description being hereby incorporated by reference and deemed to form a part of the present application; suffice to say that the wear compensator device 90 comprises ramp means 91 having circumferentially disposed inclined ramps; a sheet metal ring is cut and pressed to feature circumferentially disposed ramps; said ring 91 also has bearing areas 92 consisting in the rounded top edge of circular arc-shape pressed portions centred on the axis of the clutch and here radially outside the ramps. The face of the pressure plate 3 facing towards the back of the cover 8 has integral circumferentially spaced studs 32 the distance between which corresponds to the circumferential distance between two successive ramps, each stud 32 being adapted to co-operate with a ramp. The ramp means 91 are disposed axially between the peripheral part 21 of the diaphragm 2 and the pressure plate 3 so that the studs 32 receive the ramps and peripheral part 21 of the diaphragm 2 cooperates with the bearing areas 92 which therefore constitute the bearing means through which the diaphragm 2 acts on the pressure plate 3.

An assistance spring washer 7 bears on one side on a member fixed relative to the cover 8 and on the other side on the fingers 23 of the diaphragm 2 and is therefore adapted to act in the clutch release direction.

To be more precise, and in accordance with the invention, the assistance washer 7 is disposed axially between the diaphragm 2 and the pressure plate 3, being radially in line with the fingers 23 of the diaphragm 2 and radially inside the area delimited by the holes 22 in the diaphragm 2; here the assistance washer 7 has a Belleville washer outer part 71 extended radially towards the axis by extensions 72 separated by radial slots; the extensions 72 extend towards the free end of the fingers 23 of the diaphragm 2, to which they are fixed, for example by rivets 73.

Here the outside periphery of the Belleville washer part 71 of the assistance washer 7 bears on a rounded edge 42 that faces the pressure plate 3 and features the inside edge of the ring washer 4.

The spring characteristics of the assistance washer 7 are such that when the clutch is engaged and the friction linings are new it does not apply any axial force to the fingers 23 of the diaphragm 2; the force clamping the linings between the reaction plate and the pressure plate 3 is that imparted by the peripheral part 21 of the diaphragm 2; if the fingers 23 of the diaphragm 2 are moved in the direction of the arrow F to release the clutch the assistance washer 7 applies traction to the fingers 23 of the diaphragm 2, at the location of the rivets 73 and in the direction of the arrow F, bearing on the cover 8 through the intermediary of the ring washer 4 and the bush 5, so reducing the force required to release the clutch; at the end of the clutch release operation, corresponding for example to the outer part 21 of the diaphragm 2 abutting against the back 80 of the cover 8, the assistance washer 7 does not apply any force to the diaphragm 2.

Because of the presence of the wear compensator device 90 the positions of the diaphragm 2 and of the assistance washer 7 are fixed and independent of the wear of the linings when the clutch is engaged and released; the clutch release assistance provided by the assistance washer 7 is therefore independent of such wear, as is the clamping force.

The invention associates an assistance washer 7 with a diaphragm and with a wear compensator device without it being necessary to modify the cover 8; also, the assistance washer is disposed in a gap between the pressure plate 3 and the diaphragm 2 and its presence does not change the overall axial dimension of the clutch mechanism.

Figure 2:
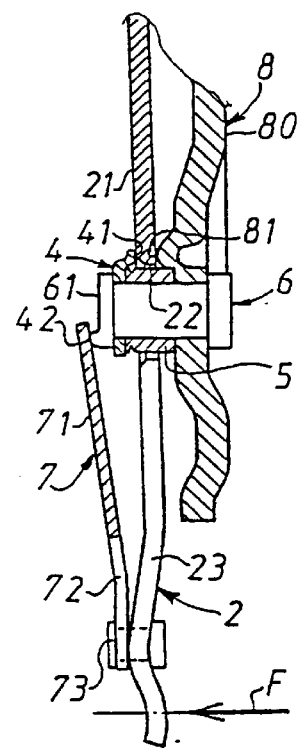
FIG. 2 is a partial half-view in axial section of a variant of the mechanism from FIG. 1.

In the FIG. 2 variant the support 42 for the assistance washer 7 is not carried by the ring washer 4 but instead by the head 61 of the rivets 6 which is shaped accordingly, means (not shown) being provided for indexing the rivets.

Figure 3:
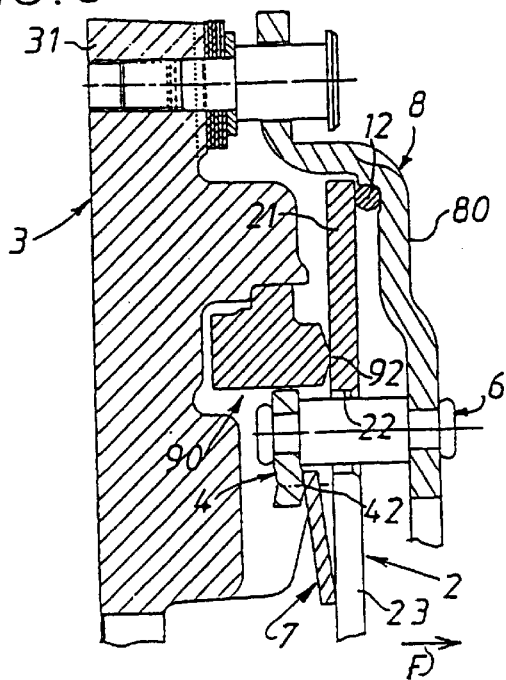
FIG. 3 is a half-view in axial section of a pull type mechanism in accordance with the invention.

FIG. 3 shows the application of the invention to a pull type clutch; in this figure parts identical to those of previous variants or having the same function are identified by the same reference numbers. The clutch being of the pull type, the outside periphery of the diaphragm 2 bears on the cover 8 through the intermediary of a ring 12 and its two supports 12 and 92 are radially interchanged: the clutch is released by moving the ends of the fingers 23 of the diaphragm 2 in the direction of the arrow F in FIG. 3.

Of course, the wear compensator device can be of the type described in document GB-A-2 294 301.

Here the edge 42 of the ring washer 4 on which the assistance washer 7 bears faces the diaphragm 2, the assistance washer 7 operating in compression between the fingers 23 of the diaphragm 2 and said edge 42.

Here the rivets 6 fastening the ring washer 4 to the back 80 of the cover 8 have two shoulders, one shoulder at each end of the body passing through the holes 22 in the diaphragm 2.

Figure 4:
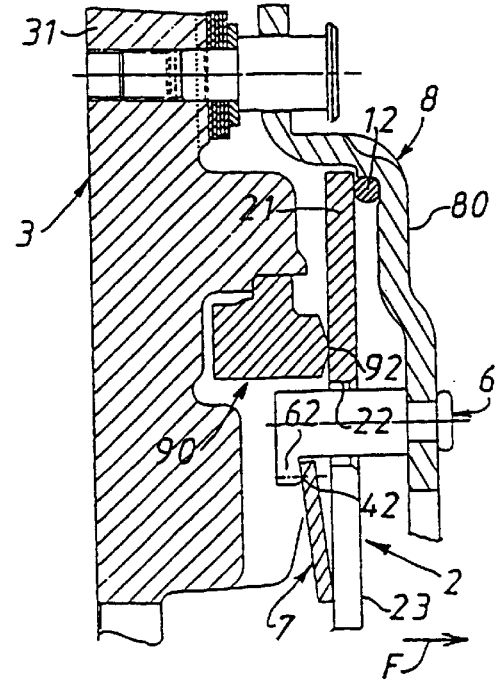
FIG. 4 is a half-view in axial section showing a variant of the clutch mechanism in accordance with the invention shown in FIG. 3.
Figure 5:
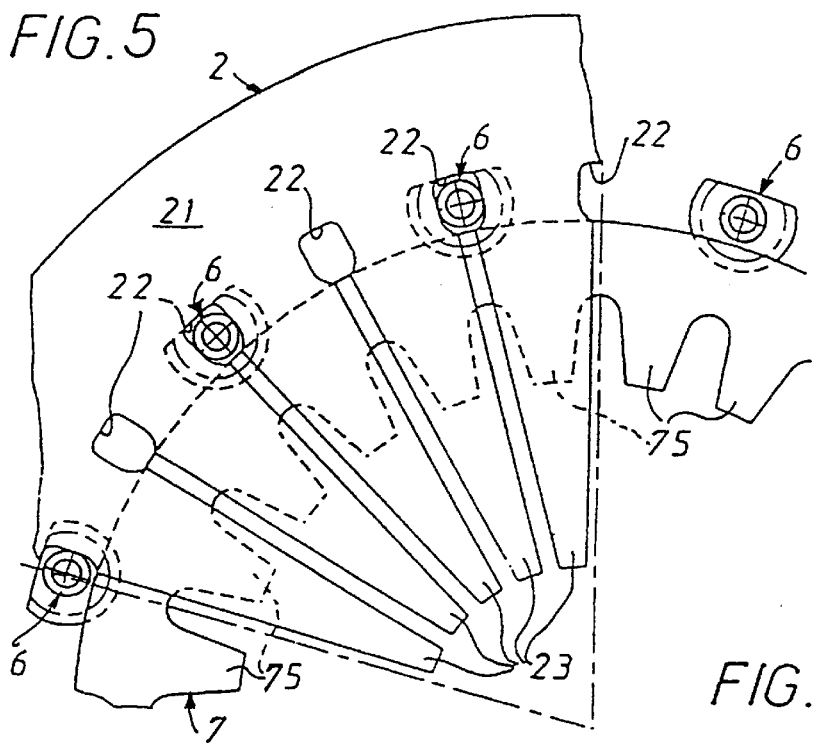
FIG. 5 is a partial view as seen from the righthand side in FIG. 4 showing only the diaphragm, the assistance washer and the rivets.

In the FIG. 4 variant the rivets 6 are in the form of columns; they have only one shoulder at the same end as the cover 8 and a head 62 shaped to carry the rounded edge 42 facing the back 80 of the cover 8; as shown in FIG. 5, the inside periphery of the assistance washer 7 is cut out to constitute teeth 75; the number of teeth 75 is advantageously the same as the number of fingers 23 of the diaphragm, with which the teeth 75 co-operate. This arrangement is equally possible for the FIGS. 3 and 4 variants.

Figure 6:
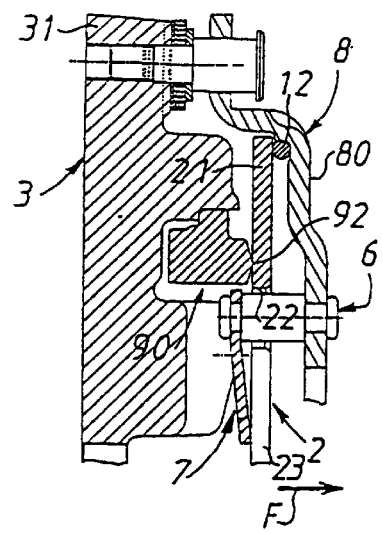
FIG. 6 is a variant of FIG. 3 or 4.
Figure 7:
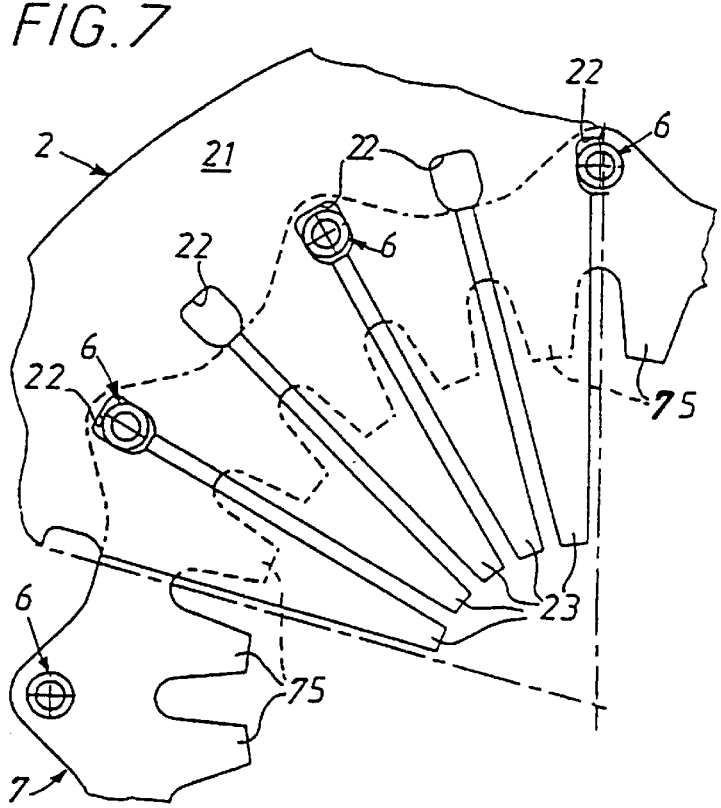
FIG. 7 is a partial view as seen from the righthand side in FIG. 6 showing only the diaphragm, the assistance washer and the rivets.

In the variant shown in FIGS. 6 and 7 the outside periphery of the assistance washer 7 is riveted to the rivets 6.

The wear compensator device can of course have any shape.

Accordingly, this device can feature ramps carrying teeth meshing with a lead screw as described in French Patent Application number 96 11297 filed Sep. 17, 1996.

It can include springs operative between the ramps and counter-ramps replacing the studs 32, as described in document EP-A-0 622 559.

What is claimed is:

1. A clutch mechanism for friction clutches, in particular for motor vehicles, including a cover (8) with a transversely oriented back (80) and fixing means for fixing the clutch mechanism to a rotational drive flywheel, a pressure plate (3) having a front friction face (30) to co-operate with a clutch friction disc, means (9) for rotationally coupling the pressure plate (3) to the cover (8), allowing axial movement, and, disposed between the pressure plate (3) and the back (80) of the cover (8), a diaphragm (2) having an outside peripheral part (21) urging the pressure plate (8) axially away from the back (80) of the cover (8) and extended inwardly by fingers (23) to oppose selectively the action of said peripheral part (21.), an assistance spring washer (7) bearing on the cover (8) and operating on the fingers (23) of the diaphragm (2) in the clutch release direction, the mechanism being equipped with a wear compensator device (90) for compensating wear of at least the friction linings of the clutch friction disc, characterised in that the assistance washer (7) is disposed axially between the pressure plate (3) and the diaphragm (2).

2. A mechanism according to claim 1 characterised in that the spring characteristics of the assistance washer (7) are chosen so that when the clutch is engaged and the clutch friction disc is new the action exerted by the assistance washer (7) is very low or even zero.

3. A mechanism according to claim 2 characterised in that the spring characteristics of the assistance washer (7) are chosen so that the action exerted by the assistance washer (7) during clutch release increases and then decreases to a very low or even zero value when the clutch is released.

4. A mechanism according to claim 1 wherein the fingers (23) of the diaphragm (2) are separated by radial slots that open into holes (22) at the inside periphery of the peripheral part (21) of the diaphragm (2) characterised in that the assistance washer (7) is globally radially inside the area delimited by the holes (22) in the diaphragm (2).

5. A mechanism according to claim 4 characterised in that the assistance washer (7) bears on the cover (8) through the intermediary of a ring washer (4) attached to the back (80) of the cover (8) by rivets (6) that pass through holes (22) in the diaphragm (2).

6. A mechanism according to claim 5 wherein the clutch is of the push type and characterised in that the assistance washer (7) bears on an edge (42) on the inside periphery of the ring washer (4) and facing the pressure plate (3) and is fixed to the fingers (23) of the diaphragm (2).

7. A mechanism according to claim 5 wherein the clutch is of the pull type and characterised in that the assistance washer (7) bears on an edge (42) at the inside periphery of the ring washer (4) and facing the back (80) of the cover (8).

8. A mechanism according to claim 4 characterised in that the assistance washer (7) bears on the cover (8) through heads (61, 62) of rivets that pass through holes (22) in the diaphragm (2).

9. A mechanism according to claim 8 wherein the clutch is of the push type and characterised in that the assistance washer (7) bears on an edge (42) that faces the pressure plate (3) and is provided on the heads (61) of the rivets (6).

10. A mechanism according to claim 8 wherein the clutch is of the pull type and characterised in that the assistance washer (7) bears on an edge (42) that faces the back (80) of the cover (8) and is provided on the heads (61) of the rivets (6).

11. A mechanism according to claim 8 wherein the clutch is of the pull type and characterised in that the outside periphery of the assistance washer (7) is attached to the rivets (6).

12. A mechanism according to claim 4 characterised in that the inside periphery of the assistance washer is cut out to constitute teeth (75) co-operating with the fingers (23) of the diaphragm (2).

* * * * *